3,302,002
UNIFORMLY HEATED CONDUCTIVE PANELS
Robert A. Warren, Sunland, Calif., assignor to The Sierracin Corporation, Sylmar, Calif., a corporation of California
Filed Aug. 11, 1966, Ser. No. 571,922
7 Claims. (Cl. 219—543)

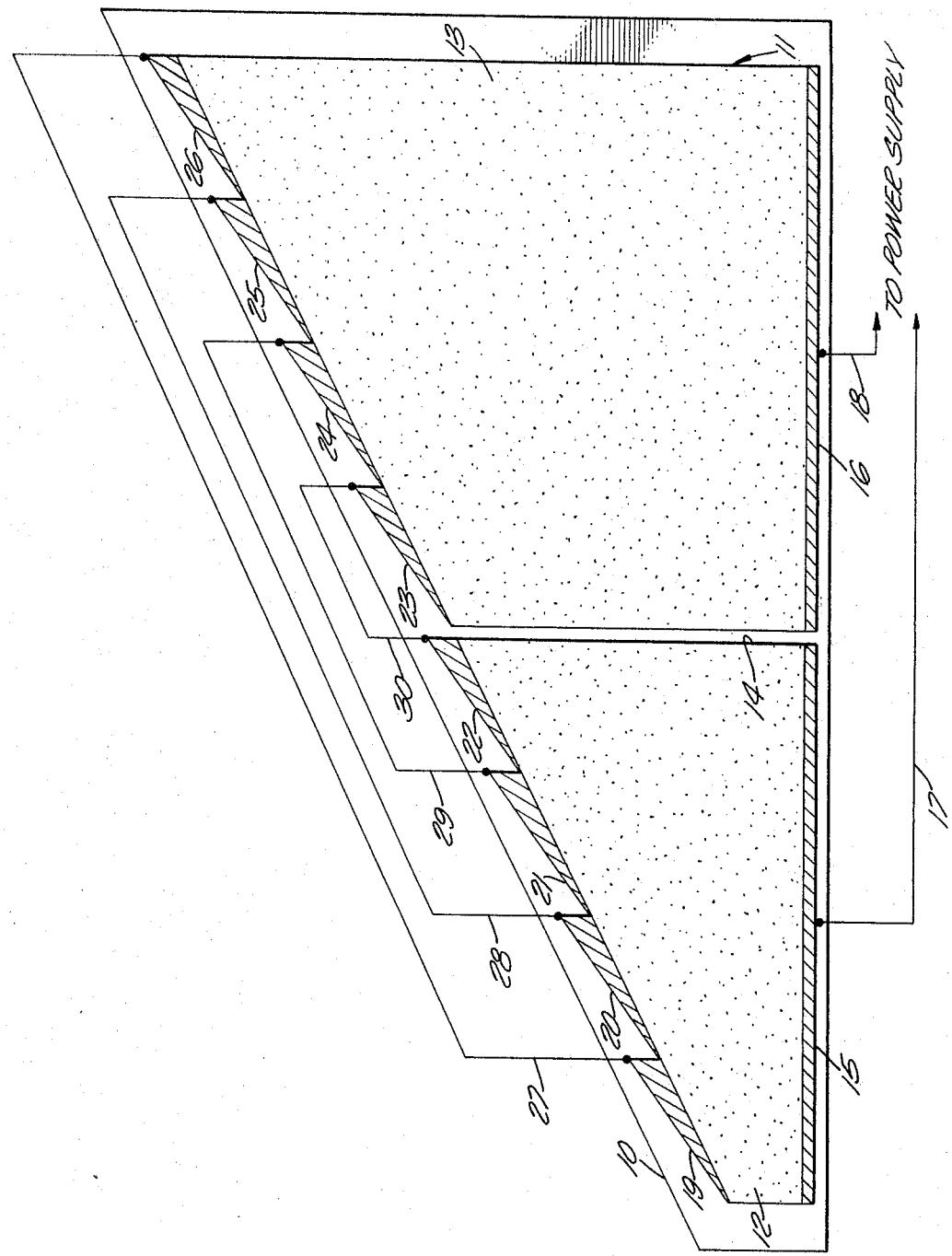

This invention relates to a uniformly heated conductive panel and more particularly relates to a system for uniformly heating a transparent conductive coating deposited on an irregularly shaped substrate.

In the construction of aircraft windshields and canopies it is desirable that means be provided for maintaining these elements at an elevated temperature so as to prevent icing or fogging. Generally, this is accomplished by incorporating in the windshield structure a panel of glass or clear plastic on which is deposited a thin coating of a transparent conductive material. Suitable electrical leads are connected to the conductive material and, if necessary, temperature sensing elements are appropriately located in the structure to control the application of electrical energy to the conductive coating.

The conductive coating materials generally used for this purpose are not completely transparent and therefore cause some loss in the transmission of visible light, the loss increasing with thickness of the coating. There are, therefore, limits to the thickness of the coating that can be applied to elements of this type. Since the resistivity of the coating is inversely proportional to its thickness, there is also a practical lower limit to the resistivity of the coating. Conductive coatings of this type can only sustain a certain maximum power density before being subject to failure, this power density, measured in watts per square inch, being inversely proportional to resistivity. Thus, for maximum effectiveness, the coating must be thick enough to allow enough heat to be generated to maintain the panel at a desired temperature without exceeding the maximum tolerable power density, and yet thin enough to permit sufficient light transmission.

When the panel to be heated is rectangular, there is generally no problem in achieving a suitable solution. A sufficient thickness coating is deposited on the panel and bus bars are disposed along its edges, the bus bars typically being painted silver strips. Since the bus bars are a constant distance apart, the power density across the entire panel is uniform and the panel is uniformly heated. When the panel to be heated is not rectangular, however, the problem becomes much more difficult of solution. Such a situation often arises with aircraft windshields and canopies which are usually tapered rather than rectangular.

When a panel is non-rectangular, for example, tapered, the bus bars are not a constant distance apart and thus, given a constant thickness of the conductive coating, the power density will vary throughout the panel, being higher at the narrow end. In order for the power density at the wide end to be sufficient to generate enough heat, it often occurs that the power density at the narrow end would exceed the maximum value tolerable. One solution that has been proposed to this problem is to provide the narrow end with a thin coating and gradually increasing its thickness toward the wide end. This results in the narrow end having a greater resistivity than the wide end, and by proper choice of the resistivity gradient a uniform power density can be obtained. This solution has been found unsatisfactory in many instances because the light transmittance requirements prohibit the thickening of the coating sufficiently to achieve uniform power density. In addition, the actual physical deposition of the coating according to a required computed gradient is relatively difficult and expensive.

Another solution to the problem is shown in Thomson et al. Patent No. 2,878,357, entitled, "Electric Heated Laminated Glass Panel." According to that patent, a conductive coating of uniform thickness is deposited on a non-rectangular panel so that the coating has a uniform power density over its surface. The coating is divided into a plurality of discrete sections of proper area and configuration and the sections are then electrically interconnected to form a plurality of parallel circuits, each circuit having the same total resistance, so that the current supply to the system will be substantially equally divided among the various parallel circuits. While this type of system is more satisfactory than the thickness gradient type of system, there is a non-uniform flow of current from the bus bar into each section of the coating because of the different length of the section along its corresponding bus bar segment. As a result, there are alternate hot and cold areas along the segmented bus bar. The differential between these hot and cold areas may be reduced by decreasing the width of the section and thereby increasing the number of bus bar segments, but in doing so, an equal number of isolation lines must be provided. A large number of isolation lines are undesirable because they move the surface away from the desired condition of uniform transmittance.

The patent to Linder No. 2,710,900, entitled, "Electro Conductive Article," suggests that the problems raised by a tapered windshield can be solved by providing a number of areas of lower resistance than the conductive coating in the longest current paths to reduce the resistance of these paths and equalize the current flow through the film. Such areas, however, are difficult to apply from a production standpoint and furthermore cause the transmittance of the windshield to be non-uniform. Linder also appears to suggest that one of the bus bars can be made of two different materials so that better current equalization can be obtained. Using two different materials for a single bus bar also results in production problems. In addition, the single bus bar approach taught by Linder requires an enormous wattage dissipation in the bus bar which would not be acceptable under practical conditions.

According to the present invention, an non-rectangular panel is provided which has a conductive coating deposited thereon which has a uniform power density over its surface but which requires a minimum number of isolation lines. This is accomplished by dividing the coating into a plurality of relatively large discrete sections of proper area and configuration and providing each of the sections with a plurality of bus bar segments, each segment having a resistance gradient along its length, the higher resistance region of each segment being associated with the lowest resistance region of its respective portion of the coating section. The bus bar segments of the various sections are interconnected in a manner similar to that shown in the aforesaid Thomson et al. patent so that a plurality of parallel paths of equal resistance are provided. By segmenting and providing a resistance gradient for each bus bar, the coating sections can be made much larger than has previously been possible and thus the number of undesired isolation lines is reduced.

It is therefore an object of the present invention to provide a non-rectangular conductive panel having a uniform power density.

It is another object of the present invention to provide an electrically conductive transparent coating having a minimum number of discontinuities therein for an irregularly shaped object.

It is also an object of the present invention to provide such a coating having a uniform thickness and resistivity.

These and other objects and advantages of the present invention will become more apparent upon reference to the accompanying description and drawings, the single figure of which is a plan view of a panel having a conductive coating positioned thereon in accordance with the present invention.

Turning now to the single figure of the drawing, a trapezoidal panel 10 of glass or other transparent material is provided with a coating of transparent conductive material, the coating being indicated generally at 11. The coating 11 is divided into two discrete portions 12 and 13 by an isolation strip 14. The isolation strip 14 can be formed of a non-conductive material but is generally merely a thin area in which no conductive material has been deposited or, if initially deposited, has been subsequently scribed or otherwise removed. The conductive material may, for example, be a transparent conductive coating of the type formed from the vapors of a mixture of stannic chloride, water and methanol, or may be of vapor deposited gold.

As can be seen, each of the sections 12 and 13 of the conductive coating is also generally trapezoidal in configuration. The base of the trapezoidal coating section 12 is provided with a bus bar 15 painted along its entire length. This bus bar 15 may be formed of any suitable conductive material and preferably takes the form of silver painted onto the panel 10 so that it abuts and makes good electrical contact with the base of the coating section 12. Similarly, a bus bar 16 is provided on the base of the trapezoidal coating section 13. The bus bars 15 and 16 are connected to a power supply by means of electrical conductors 17 and 18 respectively. The upper or sloping side of the trapezoidal coating section 12 is also provided with a bus bar made up of a plurality of saw tooth segments 19, 20, 21 and 22. In a similar manner, the sloping side of the trapezoidal coating section 13 is also provided with a bus bar made up of saw tooth segments 23, 24, 25 and 26. Preferably, each of the saw tooth segments 19–26 is formed of silver paste painted onto the substrate or panel 10 so that they abut and make good electrical contact with the sections 12 and 13 of the conductive coating.

The segments 19 and 26 are electrically connected by a conductor 27. Similarly, segments 20 and 25 are connected by a conductor 28; segments 21 and 24 are connected by a conductor 29 and segments 22 and 23 are connected by a conductor 30. The conductors 27, 28, 29 and 30 may be external connectors as shown or may be formed directly on the substrate 10, for example, by means of painted silverpaste. As illustrated, it is preferable that the conductors 27–30 be connected to their respective segments at the widest portion of each segment. As can be seen, the conductors 27, 28, 29 and 30 complete an electrical circuit from one side of a power supply (not shown) through the conductor 17, the bus bar 15, the coating section 12, each of the bus bar segments 19, 20, 21 and 22, the conductors 27–30, the bus bar segments 23, 24, 25 and 26, the coating section 13, the bus bar 16 and the conductor 18 to the other side of the power supply.

Because of the declining width of each of the bus bar segments 19–26, each of these has a resistance gradient, the resistance being lowest at the point where the conductor is attached and highest where the two opposite sides of the conductive segment come closest together. The purpose of providing these segmented bus bars is to provide a uniform current outflow along the length of the bus bar into the conductive coating so that uniform heating is achieved. This uniform outflow of current is provided if the resistance gradient of each individual segment is made such that it compensates for the variation in resistance across a portion of the conductive coating, the portion being defined by the length of an individual bus bar segment.

As can readily be seen, because of the slope of the upper side of the conductive coating, the length of the conductive coating at the upper or right hand end of any individual bus bar segment is greater than the length of the conductive coating at the lower or left hand end of the segment. Since the resistivity of the coating is constant and the resistance is a function of length, it follows that the resistance between the bus bars of any portion of the conductive coating is greater at its right hand edge than that at its left hand edge. Consequently, if the upper bus bar has no resistance gradient, for example, as shown in the aforementioned Thomson et al. patent, the various possible current paths in any portion of the coating between the upper bus bar and the lower bus bar have different resistances with the result that more current will flow in the path at the left hand edge of the portion than will flow through the path at the right hand edge thereby causing the left hand part of the coating portion to be hotter than desired and the right hand part to be colder than desired.

By arranging the resistance gradient of each individual bus bar segment in a manner such that the resistance increases along the length of the segment, the resistance seen by the current flowing through the segment and thence through the conductive coating will be the same regardless of the path the current takes. In other words, if the sum of the resistance of the bus bar segment to any point on the bus bar-conductive coating interface plus the resistance of the coating from that point to the opposite bus bar is made equal to the sum of the resistance of the bus bar segment to any other point on the interface plus the resistance of the conductive coating from such other point to the opposite bus bar, then the current distribution along the length of the bus bar-conductive coating interface will be uniform and uniform heating will be obtained in the conductive coating.

The proper width of each individual bus bar segment at any point along its length can be determined in the following manner. Designating the length of a segment as $L_t$ and the distance from the right hand edge of the segment to any particular point of the segment as L, the current I in the segment at a distance L from the right hand edge of the segment may be described as:

$$I = I_o - \frac{I_o L}{L_t}$$

where $I_o$ equals the total current flowing into the segment.

Similarly, the voltage E at any distance L in the segment can be described by:

$$E = E_o - \frac{E_o L}{L_t}$$

where $E_o$ = the total voltage across the segment.

Since $IR = E$, we may write the following statement for an infinitesimal increment at any point L:

$$I \frac{dR}{dL} = \frac{dE}{dL}$$

Substitution and evaluation yield:

$$\left(I_o - \frac{I_o L}{L_t}\right) \frac{dR}{dL} = \frac{E_o}{L_t}$$

which reduces to:

$$\frac{dR}{dL} = \frac{E_o}{I_o L_t - I_o L}$$

which is the expression for required lineal resistivity at any point L.

The lineal resistivity $dR/dL$ for any given conductive coating material is generally known and is expressed in terms of a section of the coating of a given width. For example, the lineal resistivity of a typical silver paste is 4 ohms/inch for a strip of the material one-fourth of an inch wide. Thus, if the equation for the lineal resistivity $dR/dL$ given above has a solution at L of 2 ohms/inch, it can be readily seen that the width of a bus bar segment constructed of silver paste having a lineal resistivity of 4 ohms/inch for a one-fourth inch wide strip should have a width at the point L of one-eighth inch. The width of each other point along the bus bar segment can be similarly determined.

After the bus bar segment has been painted or similarly deposited on the panel, a resistance check can be made by further manipulating the above equation. Thus, $$\int_0^L dR = \int_0^L \frac{E_o dL}{I_o L_t - I_o L}$$

which yields:

$$R = \frac{E_o}{I_o}\left[L_n\left(\frac{I_o L_t - I_o L}{I_o L_t}\right)\right]$$

which is the expression for resistance to any point L. This may easily be measured by means of a conventional ohmmeter or the like.

While the invention has been described and illustrated in connection with a segmented bus bar in which each segment is provided with a resistance gradient by varying the width of the segment, it should be obvious that other methods of providing the bus bar segments with a resistance gradient are available and are included within the scope of the present invention. For example, the resistance gradient can be provided to the segments by varying the thickness or height of the segments rather than by their width. This can be accomplished by, for example, successive deposition of a bus bar material with appropriate masking between depositions to insure a gradual build-up in thickness from the left hand or lower end to the right hand or upper end of the segment. The resistance gradient could also be provided by varying the resistivity or conductivity of the bus bar material along the length of the segment. Obviously, any combination of these approaches could also be used. It should also be obvious that instead of individually depositing the various bus bar segments, a strip of silver paste or the like could be provided along the entire sloping edge of the conductive material and the bus bar segments formed by appropriate scribing of the silver paste.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A conductive panel comprising: a plate of electrically non-conductive material; a plurality of discrete sections of conductive material disposed on said plate, each of said sections having first and second non-parallel opposing sides; a first bus bar electrically engaging the first side of a first of said sections; a second bus bar electrically engaging the first side of a second of said sections; first bus bar means electrically engaging the second side of said first of said sections, said first bus bar means comprising a plurality of individual segments each corresponding to a portion of said first section extending between said first and second sides thereof, each of said segments having a resistance gradient along the length thereof and having its highest resistance where said first and second sides come closest together; second bus bar means electrically engaging the second side of said second of said sections, said second bus bar means comprising a plurality of individual segments each corresponding to a portion of said second section extending between said first and second sides thereof, each of said segments having a resistance gradient along the length thereof and having its highest resistance where said first and second sides come closest together; and a plurality of electrical conductors, each of said conductors electrically connecting a segment of said first bus bar means with a segment of said second bus bar means, said segments being selected for connection so that the total resistance of each circuit comprising a portion of said first section, the segment of said first bus bar means corresponding thereto, the conductor connected to said segment a portion of said second section and the corresponding segment of said second bus bar means is substantially equal to the resistance of every other such circuit.

2. The panel of claim 1 wherein the resistance gradient of each of said segments of said first and second bus bar means provides a uniform outflow of current from the segment to the corresponding portion of the conductive coating.

3. The panel of claim 1 wherein each of said electrical conductors is connected to the low resistance end of its respective segments.

4. The panel of claim 3 wherein the resistance gradient of each of said segments of said first and second bus bar means is such that the resistances of all electrical paths from a conductor to a bus bar through the segment and the coating section portion corresponding to the segment are substantially equal.

5. The panel of claim 4 wherein said resistance gradient of each of said segments is established by varying the width thereof.

6. The panel of claim 4 wherein said resistance gradient of each of said segments is established by varying the thickness thereof.

7. The panel of claim 4 wherein said resistance gradient of each of said segments is established by varying the resistivity thereof.

References Cited by the Examiner

UNITED STATES PATENTS

| | | | |
|---|---|---|---|
| 2,557,983 | 6/1951 | Linder | 219—543 |
| 2,710,900 | 6/1955 | Linder | 219—543 |
| 2,877,329 | 3/1959 | Gaiser | 219—543 |
| 2,878,357 | 3/1959 | Thomson et al. | 338—292 |

RICHARD M. WOOD, *Primary Examiner.*

V. Y. MAYEWSKY, *Assistant Examiner.*